(12) United States Patent
Yoon et al.

(10) Patent No.: US 8,415,075 B2
(45) Date of Patent: Apr. 9, 2013

(54) NI-AL ALLOY ANODE FOR MOLTEN CARBONATE FUEL CELL MADE BY IN-SITU SINTERING

(75) Inventors: Sung Pil Yoon, Seongnam-si (KR); Seong Ahn Hong, Seoul (KR); In Hwan Oh, Seoul (KR); Tae Hoon Lim, Seoul (KR); Suk-Woo Nam, Seoul (KR); Heung Yong Ha, Seoul (KR); Jonghee Han, Seoul (KR); Eun Ae Cho, Seoul (KR); Jaeyoung Lee, Incheon (KR)

(73) Assignee: Korea Institute of Science and Technology (KR)

( * ) Notice: Subject to any disclaimer, the term of this patent is extended or adjusted under 35 U.S.C. 154(b) by 981 days.

(21) Appl. No.: 12/476,779

(22) Filed: Jun. 2, 2009

(65) Prior Publication Data

US 2009/0238711 A1    Sep. 24, 2009

Related U.S. Application Data

(62) Division of application No. 11/208,903, filed on Aug. 22, 2005, now abandoned.

(30) Foreign Application Priority Data

Feb. 1, 2005    (KR) .................. 10-2005-0008954

(51) Int. Cl.
*H01M 4/88* (2006.01)
*H01M 8/14* (2006.01)

(52) U.S. Cl.
USPC ............ 429/533; 429/472; 429/527; 502/101

(58) Field of Classification Search .................. 429/472, 429/527, 533; 502/101
See application file for complete search history.

(56) References Cited

U.S. PATENT DOCUMENTS 4,404,267 A * 9/1983 Iacovangelo et al. ......... 429/474
5,229,221 A * 7/1993 Donado et al. ................ 429/535
5,558,948 A    9/1996 Doyon \* cited by examiner

*Primary Examiner* — Tracy Dove
(74) *Attorney, Agent, or Firm* — Cantor Colburn LLP

(57) ABSTRACT

Disclosed is a Ni—Al alloy anode for molten carbonate fuel cell made by in-situ sintering the Ni—Al alloy. Further, disclosed is a method for preparing the same comprising steps of preparing a sheet with Ni—Al alloy powders (S1); and installing the sheet in a fuel cell without any heat treatment for sintering the Ni—Al alloy in the sheet and then in-situ sintering the Ni—Al alloy in the sheet during a pretreatment process of the cell with the sheet (S2), wherein a reaction activity of the Ni—Al alloy anode can be maintained, the method is simple and economic, and a mass production of the Ni—Al alloy anode and a scale-up in the method are easy.

1 Claim, 2 Drawing Sheets

NI-AL ALLOY ANODE FOR MOLTEN CARBONATE FUEL CELL MADE BY IN-SITU SINTERING

CROSS REFERENCE TO RELATED APPLICATIONS

This application is a divisional application of U.S. patent application Ser. No. 11/208,903, filed Aug. 22, 2005, which claims priority to and the benefit of Korean Patent Application No. 10-2005-0008954 filed on Feb. 1, 2005, the entire contents of which are incorporated herein by reference.

BACKGROUND OF THE INVENTION

1. Field of the Invention

The present invention relates to a Ni—Al alloy anode for molten carbonate fuel cell made by in-situ sintering the Ni—Al alloy and a method for making the Ni—Al alloy anode.

2. Description of the Related Art

A fuel cell is used for directly converting chemical energy into electric energy. There are various kinds of the fuel cell, such as a molten carbonate fuel cell, a solid polymer electrolyte fuel cell, and a solid oxide fuel cell etc. The molten carbonate fuel cell is a fuel cell using the molten carbonate as its electrolyte and comprises a cathode, an electrolyte, a support and an anode etc.

A high temperature fuel cell operating at 500° C. or more, such as the molten carbonate fuel cell and the solid oxide fuel cell, mainly uses nickel for an electrode. For example, the molten carbonate fuel cell uses nickel for an anode and nickel oxide (NiO) for a cathode.

The anode in which an oxidation reaction of fuel occurs has serious problems of sintering and creep phenomena at an operating condition of high temperature and high load of 2 kg/cm$^2$ or more. That is, the reduction of porosity and the change of micro-structure such as a shrinkage etc. occur in the anode due to the sintering and the creep phenomena, thereby causing a degradation of the performance of the fuel cell.

In particular, the nickel electrode is manufactured to be porous so as to enlarge a reaction area and to provide a gas passage. When such a porous nickel electrode is used at a high temperature for a long time, the surface area and reaction rate of the nickel electrode are reduced due to the sintering. In addition, when a fuel cell having stacks of several unit cells using the porous nickel electrode is operated for a long time, there occurs a creep in the porous nickel electrode due to the load of the fuel cell, thereby reducing the performance of the fuel cell.

In the prior art for solving the above-mentioned problems of the sintering and the creep, a chromium of about 10 wt % was added to the nickel or an oxide such as $Cr_2O_3$ and $LiCrO_2$ was formed on the surface of the nickel electrode in order to improve the resistance of the nickel electrode to the sintering and the creep. It is known that a creep strain of Ni+10% Cr anode is 5% or less. However, the $LiCrO_2$ formed on the surface of the nickel electrode is dissolved in the electrolyte, thereby deteriorating the resistance of the nickel electrode to the sintering and the creep when the fuel cell is operated for a long time.

In order to improve the creep characteristic, there has been used an oxide dispersion strengthened (ODS) method of dispersing a metal oxide such as alumina in the nickel electrode since the mid-1980's. Further, there have been extensive studies for an electrode consisting of Ni—Al based alloy containing a small amount of aluminum, which is oxidized prior to nickel. It is known that the electrode consisting of Ni—Al based alloy has a creep strain of 0.5% or less and an increase of contact resistance is very slight even in a size of 1 m$^2$, which is a size of a commercial electrode.

However, the prior Ni—Al alloy electrode is expensive compared to the electrode using the existing material and has such a problem that the Ni—Al alloy electrode is not sintered in a general manufacturing process of the electrode. That is, the aluminum formed as a solid solution is primarily oxidized on the surface of the nickel electrode, thereby forming an alumina oxide having a very high melting point on the surface. Due to the alumina oxide, the sintering between the nickel particles becomes difficult.

Under the circumstances, there has been used a method of sintering the electrode through a partial oxidation-reduction wherein the surface of the electrode is partially oxidized under the condition that the nickel particle can be oxidized, and then the surface of the electrode is reduced again.

The partial oxidation-reduction method uses a phenomenon that when the nickel is oxidized into a nickel oxide, the density is changed and a volume is thus expanded. According to the partial oxidation-reduction method, the nickel particles can easily contact with each other due to the surface oxidation of the nickel, so that it is possible to progress a sintering process despite the formation of the alumina oxide and to manufacture an electrode having a proper strength. In the partial oxidation-reduction method, it is very important to control a partial pressure of oxygen, thereby preventing an occurrence of excessive micro-pores due to the volume change between nickel and nickel oxide resulting from the excessive oxidation of the nickel particle. The micro-pores eventually cause a re-distribution of the electrolyte, thereby exerting very bad influence on the life of the fuel cell.

As mentioned above, since the partial pressure of oxygen should be controlled, there have been such problems in the partial oxidation-reduction method that it is very difficult to introduce a continuous process required for a mass production and that necessary equipments become very complicated.

SUMMARY OF THE INVENTION

Accordingly, the present invention has been made to solve the above-mentioned problems occurring in the prior art. The object of the present invention is to provide a Ni—Al alloy anode for molten carbonate fuel cell made by in-situ sintering the Ni—Al alloy and a method for making the same, wherein a reaction activity of the Ni—Al alloy anode can be maintained, the method is simple and economic, and a mass production of the Ni—Al alloy anode and a scale-up in the method are easy.

In order to accomplish the object, there is provided a Ni—Al alloy anode for molten carbonate fuel cell wherein a sheet made of Ni—Al alloy powders is directly installed in the cell without any heat treatment for sintering the Ni—Al alloy in the sheet and then the Ni—Al alloy in the sheet is in-situ sintered during a pretreatment process of the cell with the sheet.

In the Ni—Al alloy anode for molten carbonate fuel cell according to the present invention, an inert gas is injected so as to control an oxidation of nickel during the in-situ sintering process.

In the Ni—Al alloy anode for molten carbonate fuel cell according to the present invention, during the in-situ sintering process, the inert gas is injected up to the point before a temperature at which organic binders used to prepare the sheet are removed, then air is injected in such a temperature scope wherein the organic binders are removed, and then hydrogen and carbon dioxide are simultaneously injected after the removal of the organic binders and up to the point before an operating temperature of the cell.

In order to accomplish the object, there is provided a method for preparing a Ni—Al alloy anode for molten carbonate fuel cell comprising steps of preparing a sheet with Ni—Al alloy powders (S1); and installing the sheet in a fuel cell without any heat treatment for sintering the Ni—Al alloy in the sheet and then in-situ sintering the Ni—Al alloy in the sheet during a pretreatment process of the cell with the sheet (S2).

In the step of S2, an inert gas is injected so as to control an oxidation of nickel during the in-situ sintering process.

In the step of S2, during the in-situ sintering process, the inert gas is injected up to the point before a temperature at which organic binders used to prepare the sheet are removed, then air is injected in such a temperature scope wherein the organic binders are removed, and then hydrogen and carbon dioxide are simultaneously injected after the removal of the organic binders and up to the point before an operating temperature of the cell.

DETAILED DESCRIPTION OF THE PREFERRED EMBODIMENTS

Figure 1:
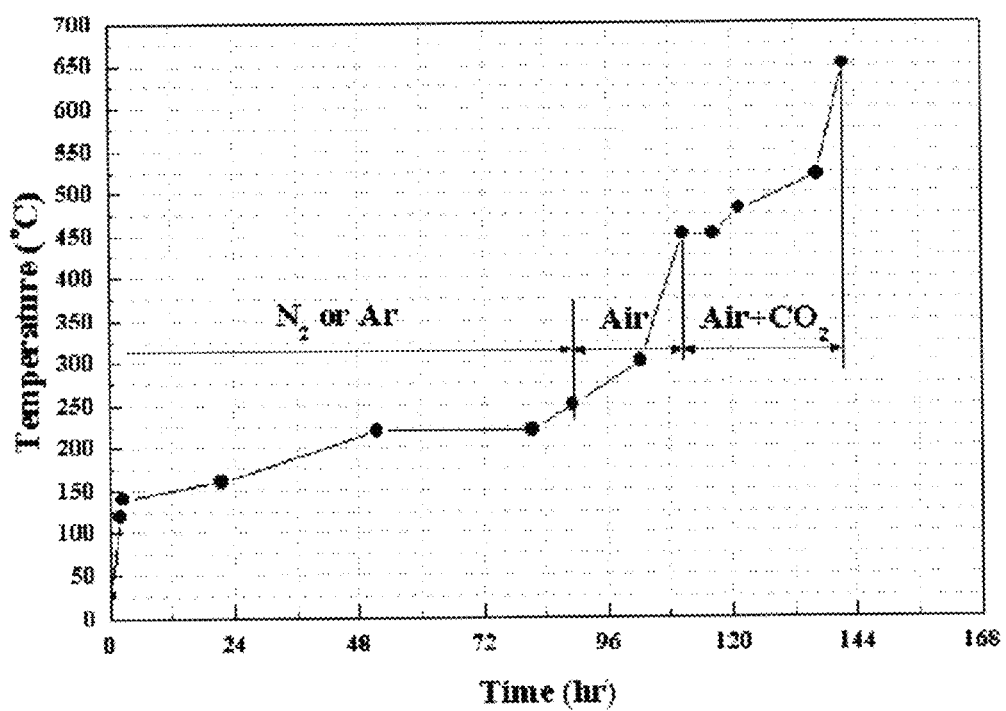
FIG. 1 is a graph showing heat treatment conditions and atmospheres when a tape made of nickel-aluminum alloy powders is directly installed in a cell without any separate heat treatment for sintering the nickel-aluminum alloy in the tape and then a nickel-aluminum alloy anode is prepared with in-situ sintering the nickel-aluminum alloy in the tape according to the present invention.

Hereinafter, the present invention will be described in detail by describing preferred embodiments with reference to the accompanying drawings.

In the present invention, "a pretreatment process of cell" is a pretreatment process of cell having a sheet made of nickel-aluminum alloy powders installed therein directly without any heat treatment for sintering the nickel-aluminum alloy in the sheet, and means a process of removing an organic material such as a binder and a plasticizer, etc. used to prepare the sheet or a process comprising the removing of the organic material and a heating up to the point before an operating temperature of the cell.

According to the invention, a sheet is prepared by, for example, the tape-casting of nickel-aluminum alloy powders, which are difficult to be sintered as mentioned above (S1). Subsequently, the sheet is directly installed to a cell without any heat treatment for sintering the nickel-aluminum alloy in the sheet, and then the nickel-aluminum alloy in the sheet is in-situ sintered in a process of removing an organic material such as a binder or a plasticizer added for preparing the sheet, or in a process of heating up to the point before an operating temperature of the cell after removing the organic material (S2). Thereby, the method for preparing the nickel-aluminum alloy anode according to the present invention is simple and economic, and a scale-up in the method and a mass production of the nickel-aluminum alloy anode are easy while a reaction activity of the nickel-aluminum alloy anode is maintained.

In particular, during the in-situ sintering of the nickel-aluminum alloy, an oxidation control is performed by injecting an inert gas such as nitrogen or argon in a specific temperature range so as to prevent an excessive oxidation of the nickel. Further, at this time, a temperature at which the inert gas is injected is determined by a temperature at which the organic materials such as an organic binder and plasticizer, etc. added in the tape-casting process are removed by a thermal decomposition and an oxidation, etc.

That is, the organic binder added in the tape-casting process is mostly removed at 300° C.~400° C. If the pretreatment is performed with the inert gas such as nitrogen or argon in the temperature range for a long time, there can occur carbon deposits, which may exert a bad influence on a cell performance.

Accordingly, a plasticizer, which has a low volatilization temperature, among the organic materials added in the tape-casting process should be primarily volatilized in the temperature range (200° C.~300° C.), and then the pretreatment should be performed with air or oxygen instead of nitrogen etc. in the temperature range (300° C.~400° C.) at which the organic binders are removed. Further, the air or oxygen treatment should be performed only for a minimal time for which the organic binder is completely removed.

According to the invention, when preparing a nickel-aluminum alloy anode for a molten carbonate fuel cell, it is possible to simplify the preparing process of the anode since an additional heat treatment process is not necessary. In addition, the method is economic, and the scale-up in the method and the mass production of the nickel-aluminum alloy anode are easy while a reaction activity of the nickel-aluminum alloy anode is maintained.

EXAMPLE

A tape of nickel-aluminum alloy powders (i.e., a green sheet) was prepared as follows:

At first, a binder, a solvent, a plasticizer and a defoamer were primary-mixed and ball-milled for 24 hours, and then nickel-aluminum alloy powders (5 wt % or less aluminum) and a dispersant were secondary-mixed and ball-milled for 2-48 hours, thereby making a slurry.

Methyl cellulose 1500 (Hayashi Pure Chemical) was used as the binder. Water was used as the solvent. Glycerol (Junsei Chemical) was used as the plasticizer. SN 154 (San Nopco Korea) and Cerasperse 5468 (San Nopco Korea) were used as the defoamer and the dispersant, respectively.

Based on 100 g of the nickel-aluminum alloy powders, 1~2 g of the binder, 40~50 g of the solvent, 1~2 g of the plasticizer, 0.1~1 g of the defoamer and 0.1~1 g of the dispersant were respectively used.

It could be checked through a slurry deposition experiment that the materials added when performing the second ball-mill were uniformly mixed. By regulating the second ball-mill time, a porosity property of the anode could be regulated to a level required for a molten carbonate fuel cell. Pores in the slurry, which were generated when performing the ball-mill, were removed through a defoaming process, and a viscosity was regulated to about 10,000~15,000 cP so as to maintain a thickness of the green sheet uniformly.

A green sheet slip was prepared with a tape-casting process using a doctor blade, and a drying was performed at a room temperature. After preparing and drying the green sheet, a green sheet cut to a size of 10 cm×10 cm was directly installed to a unit cell. Then, an in-situ sintering was performed in the pretreatment process of the unit cell.

FIG. 1 is a graph showing heat treatment conditions and atmospheres when a tape made of nickel-aluminum alloy powders is directly installed in a cell without any separate heat treatment for sintering the nickel-aluminum alloy in the tape and then a nickel-aluminum alloy anode is prepared with in-situ sintering the nickel-aluminum alloy in the tape according to the present invention As shown in FIG. 1, an inert gas such as nitrogen (or argon) was injected from a room temperature to 250° C. (for 96 hours) during a heating process comprising a process for removing the binder and the plasticizer, etc. of the tape so as to remove the plasticizer having a low volatilization temperature and to prevent an excessive oxidation of nickel in the nickel-aluminum alloy. Then, air was blown in the temperature range of 250° C.~450° C. (for 24 hours) so as to completely remove the organic binder. Then, hydrogen and carbon dioxide were simultaneously injected in the temperature range of 450° C. ~650° C. (for 24 hours) so as to prevent an excessive nickel oxidation of the nickel-aluminum particles.

Figure 2:
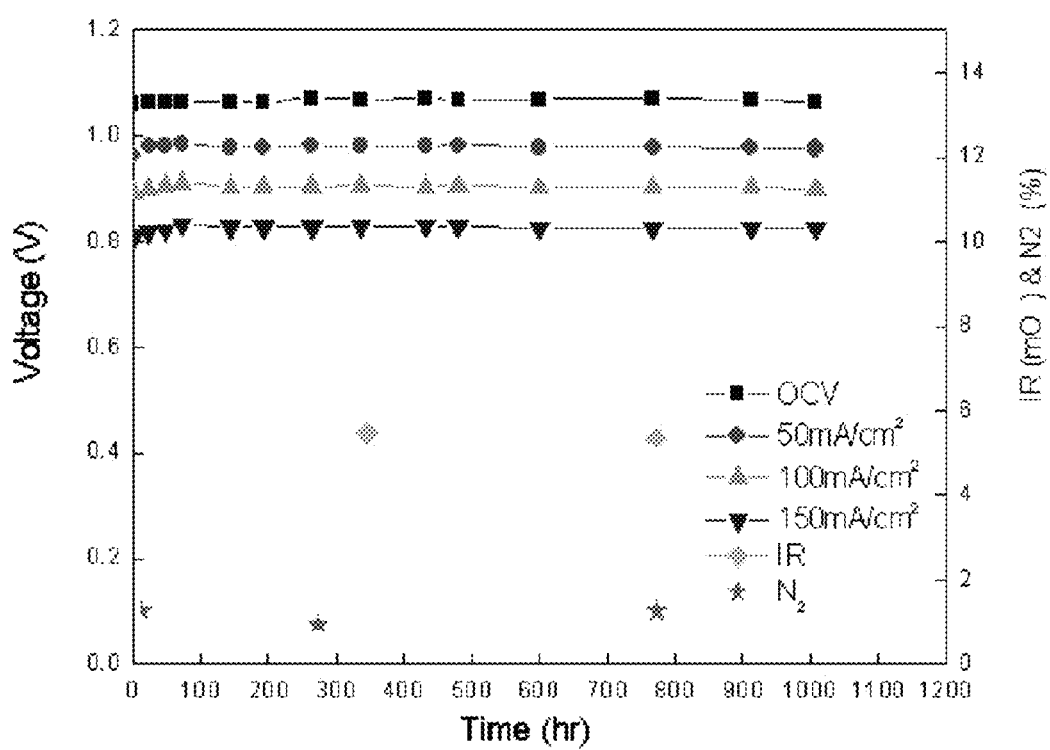
FIG. 2 is a graph showing a long time performance of a unit cell using a nickel-aluminum alloy anode for molten carbonate fuel cell made by in-situ sintering the nickel-aluminum alloy according to the present invention.

FIG. 2 is a graph showing a long time performance of a unit cell using a nickel-aluminum alloy anode for molten carbonate fuel cell made by in-situ sintering the nickel-aluminum alloy according to the present invention.

As shown in FIG. 2, the unit cell using a nickel-aluminum alloy anode for molten carbonate fuel cell made by in-situ sintering the nickel-aluminum alloy according to the present invention exhibits a constant performance for 1,000 hours.

Further, the cell exhibits an electrical conductivity and a nitrogen cross-over, etc., which are equal or superior to those of an anode made by an ex-situ sintering method such as the existing partial oxidation-reduction method.

Many alterations and modifications may be made by those having ordinary skill in the art without departing from the spirit and scope of the invention. Therefore, it must be understood that the embodiment and example described above should not be taken as limiting the invention as defined by the following claims. The claims are thus to be understood to include what is specifically described above, what is conceptionally equivalent, what can be obviously substituted and also what essentially incorporates the essential idea of the invention.

What is claimed is:

1. A method for preparing a Ni—Al alloy anode for molten carbonate fuel cell comprising steps of:
    preparing a sheet with Ni—Al alloy powders and organic binders (S1); and
    installing the sheet in the molten carbonate fuel cell without any heat treatment for sintering the Ni—Al alloy powders in the sheet, and then in-situ sintering the Ni—Al alloy in the sheet during a pretreatment process of the molten carbonate fuel cell with the sheet (S2)
    wherein, in step of S2, an inert gas is injected so as to control an oxidation of nickel during the in-situ sintering process,
    wherein, in the step of S2, during the in-situ sintering process, the inert gas is injected up to the point before a temperature at which the organic binders used to prepare the sheet are removed, then air is injected to remove the organic binders, and then hydrogen and carbon dioxide are simultaneously injected after the removal of the organic binders and up to the point before an operating temperature of the cell.

* * * * *